(12) United States Patent
Norris

(10) Patent No.: US 7,531,587 B2
(45) Date of Patent: May 12, 2009

(54) THERMAL STABILIZER COMPOSITION FOR HALOGEN-CONTAINING VINYL POLYMERS

(75) Inventor: Gene Kelly Norris, West Chester, OH (US)

(73) Assignee: Rohm and Haas Company, Philadelphia, PA (US)

( * ) Notice: Subject to any disclaimer, the term of this patent is extended or adjusted under 35 U.S.C. 154(b) by 296 days.

(21) Appl. No.: 11/494,816

(22) Filed: Jul. 28, 2006

(65) Prior Publication Data

US 2007/0049672 A1 Mar. 1, 2007

Related U.S. Application Data

(60) Provisional application No. 60/712,806, filed on Aug. 31, 2005.

(51) Int. Cl.
*C08K 5/58* (2006.01)
*C08K 3/10* (2006.01)

(52) U.S. Cl. ............... 524/180; 524/181; 524/434; 252/400.1; 252/406; 252/182.29

(58) Field of Classification Search ............ 252/400.1, 252/406, 182.29; 524/180, 181, 434
See application file for complete search history.

(56) References Cited

U.S. PATENT DOCUMENTS 7,087,193 B2 * 8/2006 Barda ................. 252/406

FOREIGN PATENT DOCUMENTS

WO  WO 02/42369  *  5/2002

* cited by examiner

*Primary Examiner*—Kriellion A Sanders
(74) *Attorney, Agent, or Firm*—Marcella M. Bodner

(57) ABSTRACT

Stabilizer compositions are used to stabilize halogen-containing vinyl polymers from, for example, degradation and discoloration. The stabilizer compositions comprise a mercaptoester, a reverse mercaptoester, and a Lewis acid.

9 Claims, No Drawings

US 7,531,587 B2

THERMAL STABILIZER COMPOSITION FOR HALOGEN-CONTAINING VINYL POLYMERS

CROSS REFERENCE TO RELATED PATENT APPLICATIONS

This is a non-provisional patent application of U.S. provisional patent application Ser. No. 60/712,806 filed Aug. 31, 2005.

BACKGROUND

This invention relates to stabilizer compositions for halogen-containing vinyl polymers, the stabilized halogen-containing vinyl polymer compositions, and articles formed therefrom, and methods for stabilizing halogen-containing vinyl polymers.

Halogen-containing vinyl polymers, for example, poly(vinyl chloride) (PVC), copolymers of vinyl chloride and vinyl acetate, and poly(vinylidine chloride), are commonly used for fabricating a variety of articles such as pipes, window casings, siding, bottles, wall covering, and packaging film. There have been many attempts to add stabilizers to halogen-containing vinyl polymers to ameliorate the color changes that can occur in the polymer resins, particularly those color changes that occur during the first one to ten minutes of processing and/or those that occur over prolonged use.

U.S. Pat. No. 3,067,166 teaches a stabilizer for PVC comprising a mercaptoester produced by reacting a primary alcohol with alpha-mercaptopropionic acid, beta-mercaptopropionic acid, or thioglycolic acid. The stabilizer also comprises a compound of zinc or tin. U.S. Pat. No. 5,166,241 teaches a stabilizer for PVC comprising a mercaptoester and a metallic or organometallic halide. U.S. Patent Application number 2002/0103277 discloses a stabilizer composition comprising a mercaptan-containing organic compound; a tin-free metal salt such as, for example, a zinc carboxylate; and/or a Lewis acid such as boron trifluoride, aluminum chloride, zinc chloride and methyltin trichloride.

The problem addressed by the invention is therefore the provision of stabilizer compositions for halogen-containing vinyl polymers, particularly stabilizer compositions that are more effective in protecting halogen-containing vinyl polymers from degradation and discoloration during processing or long-term use.

STATEMENT OF THE INVENTION

In a first aspect, there is provided a stabilized polymeric composition comprising a halogen-containing vinyl polymer; and a stabilizer composition comprising a mercaptoester, a reverse mercaptoester, and a Lewis acid; wherein the mercaptoester has a moiety having the formula HS—X—C(=O)O—, wherein the reverse mercaptoester has a moiety having the formula HS—X—OC(=O)—, and wherein X is a substituted or unsubstituted hydrocarbyl group having a valency of at least two.

In a second aspect, there is provided a stabilizer composition comprising a mercaptoester, a reverse mercaptoester, and a Lewis acid.

In a third aspect, there is provided a method of stabilizing a halogen-containing vinyl polymer comprising adding the above-described stabilizer composition to the polymer.

In a fourth aspect, there is provided an article comprising the above-described stabilized polymeric composition.

The disclosed stabilizer compositions surprisingly show improved stabilization compared to compositions comprising a mercaptoester and a zinc compound as described in U.S. Pat. No. 3,067,166 to Zaremsky; or compositions comprising a mercaptoester and a metal halide as described in U.S. Pat. No. 5,166,3241. The combination of a mercaptoester and a reverse mercaptoester with a Lewis acid provides unexpected synergy compared to a mercaptoester and a Lewis acid alone.

DETAILED DESCRIPTION

Disclosed herein is a stabilizer composition comprising a mercaptoester, a reverse mercaptoester, and a Lewis acid. Suitable Lewis acids include, for example, boron trifluoride, aluminum chloride, zinc chloride, methyltin trichloride, stannous chloride, stannic chloride, dimethyl tin dichloride, stannous fluoride, stannous iodide, stannous bromide, stannic fluoride, stannic iodide, stannic bromide, a mixed stannic halide having the general formula $SnX_nY_{n-1}$ wherein n is 4 and X and Y are chloride, bromide, fluoride, or iodide, and X and Y are not the same, or a mixture of one or more of the foregoing Lewis acids. The preferred compounds are commercially available and stable under conditions of storage and use.

The synergistic amount of the Lewis acid in the halogen-containing vinyl polymer is 0.01 phr to 0.5 phr, 0.01 phr to 0.30 phr, or 0.025 phr to 0.15 phr.

The stabilizer composition comprises a mercaptoester and a reverse mercaptoester. As used herein, a mercaptoester comprises at least one alkoxycarbonylalkyl group bonded to a sulfhydryl group, i.e., a moiety having the formula HS—X—C(=O)O-wherein X is a substituted or unsubstituted hydrocarbyl group having a valency of at least two. A reverse mercaptoester has at least one acyloxyalkyl group bonded to a sulfhydryl group, i.e., a moiety having the formula HS—X—OC(=O)— wherein X is a substituted or unsubstituted hydrocarbyl group having a valency of at least two.

Other mercaptan-containing compounds may also be present, for example alkyl mercaptans, 2-mercaptoethanol, mercapto acids, and the like, having 1 to about 400 carbon atoms and 1 to 4 mercapto groups. In particular, a 2-mercaptoethanol of the formula $R^{20}S$—$CH_2$—$CH_2$—$OR^{21}$ wherein $R^{20}$ and $R^{21}$ are H, or $R^{20}$ and $R^{21}$ together form a cyclic group of the formula —$C(R^{23})$—, wherein $R^{23}$ is a $C_1$ to $C_{12}$ straight chain or cyclic aliphatic group may be used. It has also been found that an oligomer formed by the polymerization of $R^{20}S$—$CH_2$—$CH_2$—$OR^{21}$ may be used, particularly acid-catalyzed oligomers. Such oligomers comprise at least two units derived from 2-mercaptoethanol (or a derivative thereof), and may have a molecular weight of up to 200, up to 500, up to 1000, up to 2000, or up to 3000. The oligomers may be made, for example, by polymerizing 1 part of 2-mercaptoethanol at 50 to 80° C. for 2 to 8 hours in the presence of approximately 2 to 10 wt. % of a suitable acid catalyst, such methanesulfonic acid.

Suitable mercaptoesters and reverse mercaptoesters may have 3 to 400 carbon atoms and 1 to 4 mercaptoester or reverse mercaptoester groups. Exemplary mercaptoesters and reverse mercaptoesters may have structures illustrated by the following formulas:

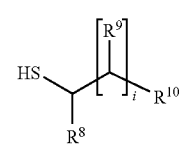

(MC-1)

-continued

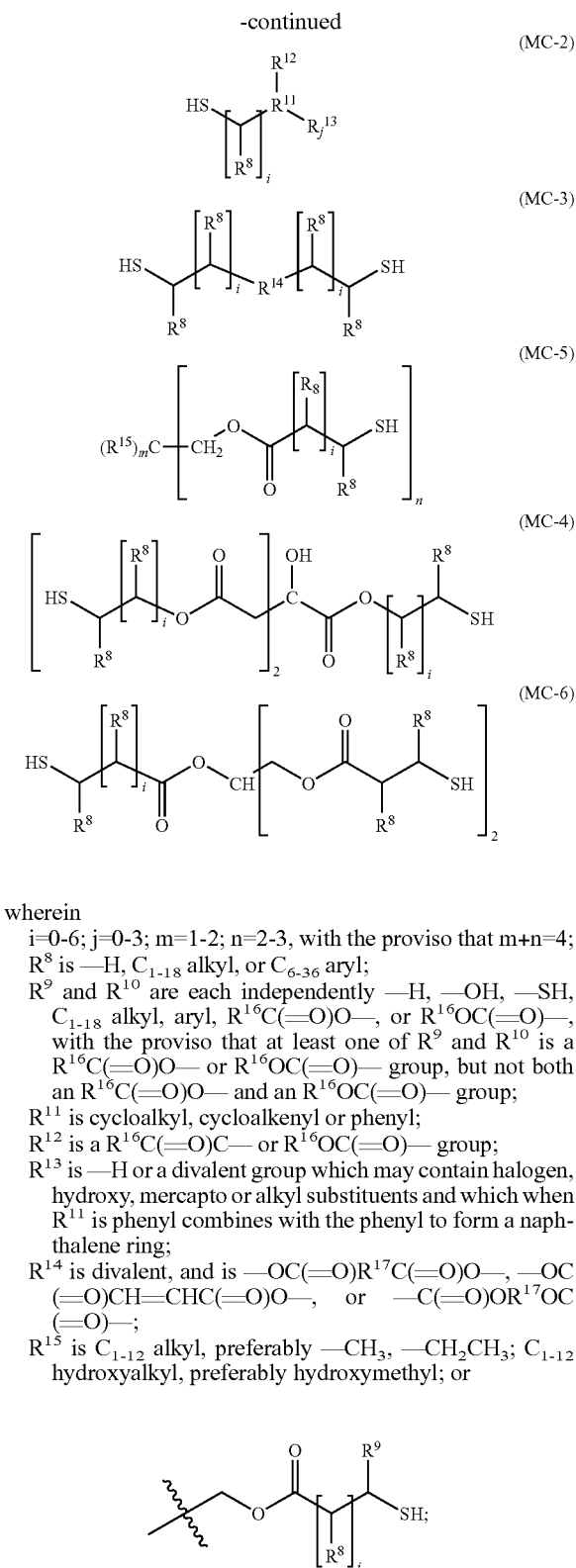

(MC-2)
(MC-3)
(MC-5)
(MC-4)
(MC-6)

wherein
i=0-6; j=0-3; m=1-2; n=2-3, with the proviso that m+n=4;
$R^8$ is —H, $C_{1-18}$ alkyl, or $C_{6-36}$ aryl;
$R^9$ and $R^{10}$ are each independently —H, —OH, —SH, $C_{1-18}$ alkyl, aryl, $R^{16}C(=O)O$—, or $R^{16}OC(=O)$—, with the proviso that at least one of $R^9$ and $R^{10}$ is a $R^{16}C(=O)O$— or $R^{16}OC(=O)$— group, but not both an $R^{16}C(=O)O$— and an $R^{16}OC(=O)$— group;
$R^{11}$ is cycloalkyl, cycloalkenyl or phenyl;
$R^{12}$ is a $R^{16}C(=O)C$— or $R^{16}OC(=O)$— group;
$R^{13}$ is —H or a divalent group which may contain halogen, hydroxy, mercapto or alkyl substituents and which when $R^{11}$ is phenyl combines with the phenyl to form a naphthalene ring;
$R^{14}$ is divalent, and is —OC(=O)$R^{17}$C(=O)O—, —OC(=O)CH=CHC(=O)O—, or —C(=O)O$R^{17}$OC(=O)—;
$R^{15}$ is $C_{1-12}$ alkyl, preferably —CH$_3$, —CH$_2$CH$_3$; $C_{1-12}$ hydroxyalkyl, preferably hydroxymethyl; or

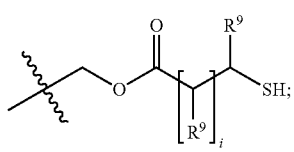

$R^{16}$ is —H, $C_{1-24}$ alkyl, $C_{1-24}$ alkenyl, $C_{6-36}$ aryl, $C_{7-36}$ aralkyl, $C_{7-36}$ alkaryl, $C_{1-16}$ cycloalkyl, or $C_{1-36}$ cycloalkenyl; and
$R^{17}$ is $C_{6-36}$ arylene, $C_{1-8}$ alkylenyl, —(CH$_2$CH$_2$O)$_b$CH$_2$CH$_2$— where b=1-6, or

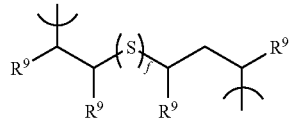

where f=1 or 2.

In one embodiment the mercaptoesters and reverse mercaptoesters are compounds according to formula MC1 where $R^8$ is —H; $R^9$ is —H; $R^{10}$ is $R^{16}C(=O)O$— or $R^{16}OC(=O)$—, and i=1; compounds according to formula MC2 where $R^{11}$ is phenyl; $R^8$ is —H; $R^{12}$ is $R^{16}C(=O)O$— or $R^{16}OC(=O)$—, $R^{13}$ is —H; j=1, and i=1; compounds according to formula MC3 where $R^8$ is —H; $R^{14}$ is —OC(=O)CH=CHC(=O)O—; and i=1; compounds according to formula MC4 where $R^9$ is —H; and i=1; and compounds according to formula MC5 where $R^{15}$ is —C$_2$H$_5$ or and $R^8$ is —H; and i=1; and compounds according to formula MC6 where $R^8$ is —H; and i=1.

Suitable mercaptoesters and reverse mercaptoesters within the scope of formula MC1 include, for example, the compounds shown in Table 1:

TABLE 1

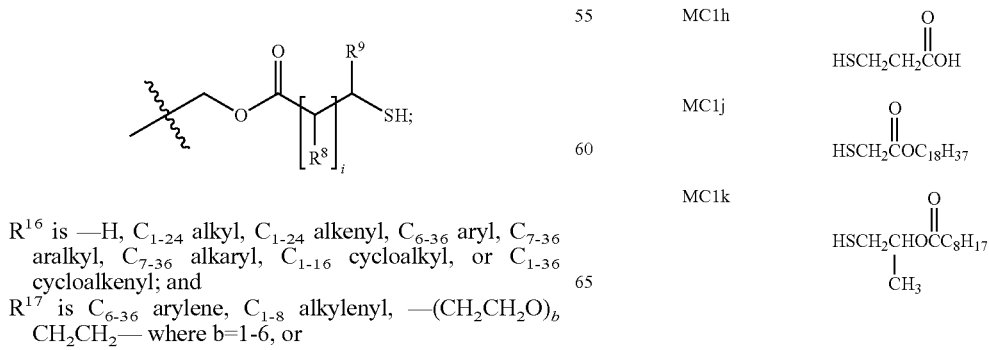

TABLE 1-continued

| | |
|---|---|
| MC1l | HSCHCOCH₃ with side chain C₁₀H₂₁ (α-carbon), C=O |
| MC1m | HSCH₂CH₂OC(=O)C₁₇H₃₅ |
| MC1n | HSCH₂CH₂OC(=O)C₁₁H₂₃ |
| MC1q | HSCH₂CH₂C(=O)OC₈H₁₇ |
| MC1r | HSCH₂CHOC(=O)CH₃ with C₉H₁₉ side chain |
| MC1s | HSCHCOH with C₁₀H₂₁ side chain, C=O |
| MC1t | HSCH₂CH₂OC(=O)C₁₇H₃₃ |
| MC1u | HSCH₂CH₂CH₂OC(=O)C₈H₁₇ |
| MC1v | phthalate with SH group on ring and two –O–C₈H₁₇ ester groups |
| | HSCH₂CH₂C(=O)OC₁₁H₂₃ |

Suitable mercaptoesters and reverse mercaptoesters within the scope of formula MC3 include, for example, the compounds shown in Table 2:

TABLE 2

| | |
|---|---|
| MC3a | HSCH₂C(=O)OCH₂CH₂OC(=O)CH₂SH |
| MC3b | HSCH₂CH₂OC(=O)CH₂CH₂C(=O)OCH₂CH₂SH |
| MC3c | HSCH₂CH₂OC(=O)CH=CHC(=O)OCH₂CH₂SH |
| MC3d | HSCH₂C(=O)OCH₂CH₂OCH₂CH₂OC(=O)CH₂SH |

TABLE 2-continued

| | |
|---|---|
| MC3e | HSCH₂C(=O)O(CH₂CH₂O)₃CH₂CH₂OC(=O)CH₂SH |
| MC3f | HSCH₂CH₂OC(=O)(CH₂)₄C(=O)OCH₂CH₂SH |
| MC3g | phthalate di(2-mercaptoethyl) ester |

Suitable reverse mercaptoesters within the scope of formula MC4 include, for example, the following compound:

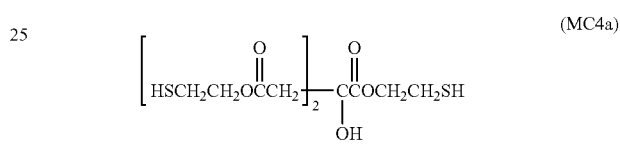
(MC4a)

Suitable mercaptoesters within the scope of formula MC5 include, for example, the following compounds:

$$CH_3CH_2C(CH_2OCCH_2SH)_3 \quad (MC5a)$$

$$C(CH_2OCCH_2SH)_4 \quad (MC5b)$$

$$HOCH_2C(CH_2OCCH_2SH)_3 \quad (MC5c)$$

$$(HOCH_2)_2C(CH_2OCCH_2SH)_2 \quad (MC5d)$$

Suitable mercaptoesters within the scope of formula MC6 include, for example, the following compounds:

$$HSCH_2CH_2COCH(CH_2OCCH_2CH_2SH)_2 \quad (MC6a)$$

$$HSCH_2COCH(CH_2OCCH_2SH)_2 \quad (MC6b)$$

Suitable mercaptoesters include, for example, stearyl thioglycolate, 2-ethylhexyl thioglycolate, diethylene glycol bis(thioglycolate), and mixtures comprising one or more of the foregoing mercaptoesters. Suitable reverse mercaptoesters include, for example, 2-mercaptoethyl stearate, 2-mercaptoethyl caproate, 2-mercaptoethyl tallate, and mixtures comprising one or more of the foregoing reverse mercaptoesters.

The amount of mercaptoester and reverse mercaptoester will vary depending on the application, and are readily determined by one of ordinary skill in the art, depending on the halogen-containing vinyl polymer formulation, processing method, intended use, and like considerations. In general, a suitable amount of mercaptoester is 0.05 phr to 5 phr, or 0.1 phr to 2 phr. A suitable amount of reverse mercaptoester is 0.05 phr to 5 phr, or 0.1 phr to 2 phr.

The stabilizer compositions optionally further comprise a metal-based stabilizer. Metal-based stabilizers are defined herein as being tin-free metal salts and include oxides, hydroxides, sulfides, sulfates, chlorides, bromides, fluorides, iodides, phosphates, phenates, perchlorates, carboxylates, and carbonates of metals other than tin, as well as combinations comprising one or more metal-based stabilizer. Suitable metal-based stabilizers include, for example, zinc, barium, strontium, calcium, magnesium, cobalt, nickel, titanium, antimony, and aluminum salts of phenols, aromatic carboxylic acids, fatty acids, epoxidized fatty acids, oxalic acid, acetic acid, and carbonic acid. Specific example of suitable metal-based stabilizers include calcium stearate, calcium 2-ethylhexanoate, calcium octanoate, calcium oleate, calcium ricinoleate, calcium myristate, calcium palmitate, calcium laurate, barium laurate, barium stearate, barium di(nonylphenolate), magnesium stearate, zinc octanoate (or caprylate), zinc 2-ethylhexanoate, zinc stearate, zinc laurate, zinc oxide, zinc hydroxide, zinc sulfide, Group I and II metal soaps (e.g., metal soaps of a fatty acid), aluminum stearate, hydrotalcite, and mixtures comprising one or more of the foregoing metal-based stabilizers. The metal-based stabilizers may be employed in amounts of 0.01 phr to 3.0 phr, or 0.05 phr to 1.0 phr, or 0.1 phr to 0.75 phr.

Optionally, the stabilizer may include other co-stabilizers such as, for example, epoxy compounds, organometallic stabilizers, phosphites, nitrogen-containing stabilizers, including hindered tertiary amines, other non-metallic stabilizers, polyols, hydrotalcites, zeolites, dawsonites, and mixtures comprising one or more of the foregoing co-stabilizers.

Suitable epoxy compounds include, for example, epoxidized oils such as soybean oil, lard oil, olive oil, linseed oil, peanut oil, castor oil, corn oil, tung oil, cottonseed oil, and mixtures comprising one or more of the foregoing epoxy compounds. Other suitable epoxy compounds include, for example, epichlorhydrin/bis-phenol A resins, butoxypropylene oxide, glycidyl epoxystearate, epoxidized α-olefins, epoxidized glycidyl soyate, epoxidized butyl toluate, glycidol, vinyl cyclo-hexene dioxide; the glycidyl ethers of resorcinol, hydroquinone, 1,5-dihydroxynaphthalene, glycerine, pentaerythritol, and sorbitol; allyl glycidyl ether, butyl glycidyl ether, cyclohexane oxide, 4-(2,3-epoxyproproxy)acetophenone, mesityl oxide epoxide, 2-ethyl-3-propyl glycidamine, and mixtures comprising one or more of the foregoing epoxy compounds. The epoxy may be present in amounts of up to 30 phr.

Suitable phosphites include, for example, trialkylphosphites such as trioctyl phosphite, tridecyl phosphite, tridodecyl phosphite, tri(tetradecyl) phosphite, tricyclohexyl phosphite, tristearyl phosphite, distearyl-pentaerythritol diphosphite, or trioleyl phosphite; triaryl phosphites such as triphenyl phosphite, tricresyl phosphite, or tris-p-nonylphenyl phosphite; alkyldiaryl phosphites such as phenyldidecyl phosphite or (2,4-di-tert-butylphenyl)didodecyl phosphite; dialkylaryl phosphites; thiophosphites such as trithiohexyl phosphite, trithiooctyl phosphite, trithiolauryl phosphite, or trithiobenzyl phosphite; or mixtures comprising any one or more of the foregoing phosphites. The phosphites can be used in an amount of, for example, 0.01 phr to 10 phr, 0.05 phr to 5 phr, and 0.1 phr to 3 phr.

Preferred organometallic stabilizers include organotin carboxylates and mercaptides. Suitable organometallic stabilizers include, for example, butyltin tris dodecyl mercaptide, dibutylin dilaurate, dibutyltin didodecyl mercaptide, dianhydride tris dibutylstannane diol, dihydrocarbontin salts of carboxy mercaptals, and mixtures comprising one or more of the foregoing organometallic stabilizers. Monosulfides and/or polysulfides of the organotin mercaptides of mercaptoalkyl carboxylates and/or alkyl thioglycolates, and mixtures comprising one or more of the foregoing, are also suitable as organometallic stabilizers.

Suitable nitrogen-containing stabilizers, include, for example, dicyandiamide, hindered amines, melamine, urea, dimethyl hydantoin, guanidine, thiourea, 2-phenylindoles, aminocrontonates, N-alkyl and N-phenyl substituted maleimides, 1,3-dialkyl-6-amino-uracil derivatives, pyrrolodiazine diones, and mixtures comprising one or more of the foregoing nitrogen-based stabilizers. The nitrogen-based stabilizers can be present in an amount of up to 10 phr. Useful sterically hindered amines include, for example, monomeric, oligomeric, or polymeric 2,2,6,6-tetramethylpiperidine compounds. The nitrogen of the piperidine moiety may be substituted by, for example, hydrogen, $C_1$-$C_{12}$ alkyl, $C_3$-$C_8$ alkenyl, or $C_7$-$C_{12}$ aralkyl. The C-4 carbon of the piperidine moiety may be substituted by, for example, hydrogen or oxygen or nitrogen-containing groups. Suitable 2,2,6,6-tetramethylpiperidine compounds include, for example, 4-hydroxy-2,2,6,6-tetramethylpiperidine, 1-benzyl-4-hydroxy-2,2,6,6-tetramethylpiperidine, 4-stearoyloxy-2,2,6,6-tetramethylpiperidine, 1,2,2,6,6-pentamethylpiperidin-4-yl-beta-(3,5-di-tert-butyl-4-hydroxyphenyl) propionate, di(2,2,6,6-tetramethylpiperidin-4-yl) succinate, 1-acetyl-2,2,6,6-tetramethylpiperidin-4-yl acetate, trimellitic acid tri(2,2,6,6-tetramethylpiperidin-4-yl) ester, and the like. The piperidines can be used in an amount of, for example 0.01 to 1 phr.

Other suitable nonmetallic stabilizers include, for example, dilaurylthiodipropionate, distearyl 3,3'-thiopropionate, dibenzyl-3,3'-thiodipropionate, dicyclohexyl-3,3'-thiodipropionate, dioleyl-3,3'-thiodipropionate, didecyl-3,3'-thiodipropionate, diethyl-3,3'-thiodipropionate, lauryl ester of 3-mercaptopropionic acid, lauryl ester of 3-lauryl mercaptopropionic acid, the phenyl ester of 3-octyl mercaptopropionic acid, and mixtures comprising one or more of the foregoing non-metallic stabilizers. The latter non-metallic stabilizers may be present in an amount of up to 0.75 phr, or 0.01 to 0.75 phr.

Suitable polyols include, for example, pentaerythritol, dipentaerythritol, tripentaerythritol, bistrimethylolpropane, trimethylolpropane, inosite, polyvinyl alcohol, sorbitol, mannitol, lactose, tris(hydroxyethyl)isocyanurate, tetramethylolcyclohexanol, tetramethylolcyclopyranol, glycerol, diglycerol, polyglycerol, 1,3,5-tris(2-hydroxyethyl)isocyanurate (THEIC), and mixtures comprising at least one of the foregoing polyols. Preferred polyols include, for example, sorbitol and trimethylolpropane. The polyols can be used in an amount of, for example, 0.01 to 20 phr, or 0.1 phr to 10 phr.

As used herein, the term halogen-containing vinyl polymer means a halogen-containing polymer in which the halogens are attached directly to a carbon atom. The halogen-containing polymers include, for example, chlorinated polyethylene having 14 to 75%, e.g., 27%, chlorine by weight, chlorinated natural and synthetic rubber, rubber hydrochloride, chlorinated polystyrene, chlorinated poly(vinylidine chloride), chlorinated poly(vinyl chloride), poly(vinyl bromide), poly (vinyl fluoride), other vinyl chloride polymers, and mixtures comprising one or more of the foregoing polymers. The vinyl chloride polymers known as polyvinyl chloride (PVC) are made from vinyl chloride monomers alone or a mixture of monomer reactants comprising, specifically, at least 70% by weight of vinyl chloride, based on the total monomer weight. Suitable co-monomers include, for example, vinyl acetate, vinyl butyrate, vinyl benzoate, vinylidene chloride, trichloroethylene, 1-fluoro-2-chloroethylene, diethyl fumarate, diethyl maleate, methyl acrylate, 2-ethylhexyl acrylate, methyl alpha-chloroacrylate, butyl acrylate, methyl methacrylate, ethyl methacrylate, butyl methacrylate, styrene, vinyl ketones such as vinyl methyl ketone and vinyl phenyl ketone, acrylonitrile, chloroacrylonitrile, allylidene diacetate, chloroallylidene diacetate, and vinyl ethers such as vinyl ethyl ether, vinyl phenyl ether, the vinyl ether prepared by the reaction of one mole of acrolein with one mole of ethylene glycol divinyl ether, and mixtures comprising one or more of the foregoing co-monomers. Suitable halogen-containing vinyl copolymers include, for example, vinyl chloride-vinyl acetate, vinyl chloride-vinyl acetate (87:13), vinyl chloride-vinyl acetate-maleic anhydride (86:13:1), vinyl chloride-vinylidene chloride (95:5); vinyl chloride-diethyl fumarate (95:5), vinyl chloride 2-ethylhexyl acrylate (80:20), and mixtures comprising one or more of the foregoing copolymers.

A rigid halogen-containing vinyl polymer composition is one that does not contain a plasticizer. A semi-rigid halogen-containing vinyl polymer composition contains 1 to 25 parts of a plasticizer per 100 parts by weight of the halogen-containing vinyl polymer. A flexible halogen-containing vinyl polymer composition contains 25 to 100 parts of a plasticizer per 100 parts by weight of the halogen-containing vinyl polymer. Suitable plasticizers include, for example, alkyl esters of polyacids in which there are 1 to 3 alkyl groups having 8 to 12 carbon atoms. Suitable alkyl groups of the alkyl ester include, for example, n-octyl, 2-ethylhexyl, decyl, dodecyl, and mixtures comprising one or more of the foregoing alkyl groups. Suitable polyacids for the alkyl ester include, for example, phthalic acid, trimellitic acid, benzoic acid, adipic acid, sebacic acid, glutaric acid, phosphates, and the like. Polymeric plasticizers are also suitable.

Optionally, the halogen-containing polymer compositions may include other conventional additives such as, for example, antioxidants, lubricants, fillers, pigments, impact modifiers, blowing agents, processing aids, dyes, ultraviolet light absorbing agents, densifying agents, biocides, and mixtures comprising one or more of the foregoing additives. Suitable amounts of the foregoing additives are readily determined by one of ordinary skill in the art depending on the desired final properties and end use of the compositions. In general, each additive is present in an amount of 0.01 to 10 phr, or 0.1 to 5 phr.

Suitable antioxidants include, for example, phenolic antioxidants such as 2,6-di-t-butyl-p-cresol, butylated hydroxyanisole, 4,4'-thiobis(6-t-butyl-m-cresol), 4,4'-cyclohexylidenediphenol, 2,5-di-t-amyl hydroquinone, 4,4'-butylidene bis(6-t-buytl-m-cresol), hydroquinone monobenzyl ether, 2,2'-methylene-bis(4-methyl-6-t-butyl phenol), p-amino phenol, 4,4'-thiobis(3-methyl-6-t-butyl phenol), bis[o-(1,1,3, 3-tetramethyl butyl)phenol]sulfide, 4-dodecyoxy-2-hydroxybenzophenone, n-dodecyl ester of 3-hydroxy-4-(phenyl carbonyl)phenoxyacetic acid, t-butyl phenol, and mixtures comprising one or more of the foregoing antioxidants.

Suitable lubricants include, for example, paraffin waxes, salts of fatty acids, low molecular weight polyethylene (i.e., polyethylene wax), fatty acid amides (i.e., laurimide and stearamide), bis amides (i.e., decamethylene, bisamide), fatty acid esters (e.g., butyl stearate, glyceryl stearate, linseed oil, palm oil, decyloleate, corn oil, cottonseed oil, and the like), and mixtures comprising one or more of the foregoing lubricants. Suitable fillers include, for example, calcined clays, calcium carbonate, talcs, and mixtures comprising one or more of the foregoing fillers. Suitable pigments include, for example, titanium dioxide, carbon black, iron oxide, and mixtures comprising one or more of the foregoing pigments.

In general, the above-described thermal stabilizer compositions are provided as a one-part mixture formulated so as to provide one or more mercaptoesters; one or more reverse mercaptoesters; and at least one of one or more Lewis acids. As other optional additives may also be present in the one-part mixture, the particular amount of each component may vary from 0.1 to 99.9% percent by weight, specifically 1.0 to 99.0% by weight based on the total weight of the one-part mixture. Particular amounts effective to result a synergistic improvement in thermal stability are readily determined by one of ordinary skill in the art.

The halogen-containing vinyl polymer compositions may be prepared by blending under low or high shear. Likewise, the thermal stabilizer compositions may be incorporated in the halogen-containing vinyl polymer composition by mixing the components thereof and the polymer in an appropriate mill or mixer or by another method that provides uniform distribution of the stabilizer throughout the polymer. Depending on the compatibility and physical state (i.e., liquid or solid) the components of the blend may require heating to form a uniform stabilized polymer composition having the desired performance characteristics.

The stabilized halogen-containing vinyl polymer composition can be used to form a variety of rigid articles such as, for example, house siding, window profiles, and pipe by using a variety of techniques to shape the articles such as, for example, molding, extrusion, and injection molding.

In one embodiment, a synergistic combination comprising 2-ethylhexylthioglycolate, 2-mercaptoethyltallate, and zinc chloride can provide improved long-term color stability, preferably together with the improved early color.

Stabilizer compositions comprising one or more mercaptoesters; one or more reverse mercaptoesters; and at least one of one or more Lewis acids as described herein act synergistically to protecting halogen-containing vinyl polymers from degradation and discoloration during processing or long-term use. The invention is further illustrated by the following non-limiting examples.

EXAMPLES

The invention is further illustrated by the following examples, wherein PVC compositions for thermal stability testing were prepared by mixing, under high shear, 100 parts by weight of PVC resin, pigment (0.2 phr), mold release agents (0.5-2 phr), co-stabilizer (1-10 phr epoxidized soybean oil), and lubricants (0.2 to 2.0 phr), together with the stabilizer compositions shown in the Tables. The mixed compositions were then heated in a two-roll mill at 390° F. (199° C.) and samples were removed at the indicated time intervals and formed into chips. Color change (as reflected by dE) and yellowness (YI) of each chip was measured using a Hunter Labs (L, a, b) calorimeter.

Examples 1-6 show the synergistic effects obtained using a combination of 2-ethylhexylthioglycolate, 2-mercaptoethyltallate, and zinc chloride.

TABLE 1

| Component | Example No. | | | | | |
|---|---|---|---|---|---|---|
| | 1* | 2* | 3 | 4* | 5* | 6 |
| 2-ethylhexylthioglycolate | 0.25 | 0 | 0.125 | 1.0 | 0 | 0.5 |
| 2-mercaptoethyltallate | 0 | 0.45 | 0.23 | 0 | 1.8 | 0.9 |
| Zinc chloride | 0.10 | 0.10 | 0.10 | 0.10 | 0.10 | 0.10 |
| dE at minute | | | | | | |
| 1 | 12 | 11.7 | 11.6 | 13.0 | 12.9 | 15.1 |
| 2 | 12 | 12.6 | 11.7 | 14.7 | 15.5 | 13.2 |
| 3 | 13.5 | 16.0 | 12.9 | 14.5 | 16.4 | 12.8 |
| 4 | 15.6 | 18.3 | 14.3 | 16.1 | 17.1 | 13.1 |
| 5 | 18.4 | 21.6 | 16.9 | 16.8 | 19.6 | 14.8 |
| 6 | 22 | 24.7 | 20.1 | 21.2 | 21.9 | 16.3 |
| 7 | 29.2 | 28.2 | 25.7 | 25.4 | 23.9 | 17.5 |
| 8 | | 30.7 | | 30.2 | 27.1 | 21.4 |
| | | | | | 30.2 | 26.3 |

*Control

As shown in Table 1, the three-part synergistic combination of a mercaptoester, a reverse mercaptoester, and a Lewis acid (Examples 3 and 6) provides improved stabilization compared to a mercaptoester and a Lewis acid (Examples 1 and 4) or a reverse mercaptoester and a Lewis acid (Examples 2 and 5). The synergy for the three-part stabilizer is observed at two different stabilizer concentrations.

Examples 7-9 show the effects of the three-part stabilizer composition at an intermediate stabilizer concentration.

TABLE 2

| Component | Example No. | | |
|---|---|---|---|
| | 7* | 8* | 9 |
| 2-ethylhexylthioglycolate | 0.5 | 0 | 0.25 |
| 2-mercaptoethyltallate | 0 | 0.90 | 0.45 |
| Zinc chloride | 0.10 | 0.10 | 0.10 |
| dE at minute | | | |
| 1 | 12.9 | 12.1 | 12.8 |
| 2 | 13.3 | 13.8 | 12.3 |
| 3 | 13.8 | 15.7 | 13.7 |
| 4 | 14.8 | 16.4 | 14.7 |
| 5 | 16.8 | 17.4 | 14.6 |
| 6 | 21.4 | 20.4 | 16.2 |
| 7 | 27.1 | 22.1 | 18.2 |
| 8 | | | 24.0 |

*Control

As shown in Table 2, intermediate concentrations of the three-part synergistic combination of a mercaptoester, a reverse mercaptoester and a Lewis acid (Example 9) provide improved stabilization compared to a mercaptoester and a Lewis acid (Example 7) or a reverse mercaptoester and a Lewis acid (Example 8). The three-part synergistic combination provided improved stabilization over the two-part combinations at similar stabilizer levels and at all concentrations tested.

All ranges disclosed herein are inclusive and combinable.

The terms "a" and "an" herein do not denote a limitation of quantity, but rather denote the presence of at least one of the referenced item.

As used herein, a hydrocarbyl group is a group that is inclusive of saturated or unsaturated hydrocarbons, i.e., alkyl, cycloalkyl, alkenyl, cycloalkenyl, aryl, aralkyl, aralkaryl, aracycloalkyl, aralkenyl, alkaryl, cycloalkaryl, and alkenylaryl groups, as well as mixtures of the foregoing groups. The term is specifically contemplated to include mixtures of hydrocarbons derived from natural sources, for example tall oil, and the like. Further, alkyl groups and the alkyl portion of the foregoing groups may be linear or branched unless otherwise indicated. The term oxyalkylenyl means a divalent group of a polyalkylene ether molecule. The abbreviation "phr" refers to parts by weight of a particular component per 100 parts by weight of the halogen-containing vinyl polymer.

As used herein, "alkyl" is intended to include both branched and straight-chain saturated aliphatic hydrocarbon groups, having the specified number of carbon atoms. Thus, the term $C_1$-$C_6$ alkyl as used herein includes alkyl groups having from 1 to 6 carbon atoms. When $C_0$-$C_n$ alkyl is used herein in conjunction with another group, for example, (phenyl)$C_0$-$C_4$ alkyl, the indicated group, in this case phenyl, is either directly bound by a single covalent bond (Co), or attached by an alkyl chain having the specified number of carbon atoms, in this case from 1 to about 4 carbon atoms. Examples of alkyl include, but are not limited to, methyl, ethyl, n-propyl, isopropyl, n-butyl, t-butyl, n-pentyl, and sec-pentyl.

"Alkenyl" as used herein, indicates a hydrocarbon chain of either a straight or branched configuration having one or more carbon-carbon double bond bonds, which may occur at any stable point along the chain. Examples of alkenyl groups include ethenyl and propenyl.

"Alkoxy" represents an alkyl group as defined above with the indicated number of carbon atoms attached through an oxygen bridge. Examples of alkoxy include, but are not limited to, methoxy, ethoxy, n-propoxy, i-propoxy, n-butoxy,2-butoxy, t-butoxy, n-pentoxy, 2-pentoxy, 3-pentoxy, isopentoxy, neopentoxy, n-hexoxy, 2-hexoxy, 3-hexoxy, and 3-methylpentoxy.

As used herein, the term "aryl" indicates aromatic groups containing only carbon in the aromatic ring or rings. Typical aryl groups contain 1 to 3 separate, fused, or pendant rings and 6 to 18 ring atoms, without heteroatoms as ring members. When indicated, such aryl groups may be further substituted with carbon or non-carbon atoms or groups. Such substitution may include fusion to a 5 to 7-membered saturated cyclic group that optionally contains 1 or 2 heteroatoms independently chosen from N, O, and S, to form, for example, a 3,4-methylenedioxy-phenyl group. Aryl groups include, for example, phenyl, naphthyl, including 1-naphthyl and 2-naphthyl, and bi-phenyl.

The term ester alkyl indicates and alkyl group as define above attached through an ester linkage, i.e. a group of the formula —O(C=O)alkyl.

"Alkoxy carbonyl" refers to an alkoxy group adjacent a carbonyl group, i.e., a group of the formula alkyl —O(C=O)—.

What is claimed is:

1. A stabilized polymeric composition comprising a halogen-containing vinyl polymer; and a stabilizer composition comprising a mercaptoester, a reverse mercaptoester, and a Lewis acid; wherein the mercaptoester has a moiety having the formula HS—X—C(=O)O—, wherein the reverse mercaptoester has a moiety having the formula HS—X—OC (=O)—, wherein X is a substituted or unsubstituted hydrocarbyl group having a valency of at least two, and wherein the Lewis acid is zinc chloride.

2. The stabilized polymeric composition of claim 1, wherein the mercaptoester is stearyl thioglycolate, 2-ethylhexyl thioglycolate, diethylene glycol bis(thioglycolate), or a mixture comprising one or more of the foregoing mercaptoesters.

3. The stabilized polymeric composition of claim 1, wherein the reverse mercaptoester is 2-mercaptoethyl stearate, 2-mercaptoethyl caproate, 2-mercaptoethyl tallate, or a mixture comprising one or more of the foregoing reverse mercaptoesters.

4. The stabilized polymeric composition of claim 1, wherein the stabilizer composition further comprises a polyol; a nitrogen-containing compound; a 2-mercaptoethanol of the formula $R^{20}S-CH_2-CH_2-OR^{21}$ wherein $R^{20}$ and $R^{21}$ are H, or $R^{20}$ and $R^{21}$ together form a cyclic group of the formula $-C(R^{23})-$, wherein $R^{23}$ is a $C_1$ to $C_{12}$ straight chain or cyclic aliphatic group; an oligomer formed by the polymerization of $R^{20}S-CH_2-CH_2-OR^{21}$ and having at least two units derived from $R^{20}S-CH_2-CH_2-OR^{21}$ and a weight average molecular weight of up to 3000; or a mixture of one or more of the foregoing stabilizers.

5. The stabilized polymeric composition of claim 1, wherein the composition comprises 0.05 phr to 5 phr of the mercaptoester; 0.05 phr to 5 phr of the reverse mercaptoester; and 0.01 phr to 0.5 phr of the Lewis acid, all based on 100 parts of the halogen-containing vinyl polymer.

6. A stabilizer composition comprising a mercaptoester, a reverse mercaptoester, and a Lewis acid; wherein the mercaptoester has a moiety having the formula $HS-X-C(=O)O-$, wherein the reverse mercaptoester has a moiety having the formula $HS-X-OC(=O)-$, and wherein X is a substituted or unsubstituted hydrocarbyl group having a valency of at least two.

7. A method of stabilizing a halogen-containing vinyl polymer comprising adding to the halogen-containing vinyl polymer the stabilizer composition of claim 6.

8. An article comprising the composition of claim 1.

9. The article of claim 8, wherein the article is a pipe, a window casing, siding, a bottle, wall covering or packaging film.

\* \* \* \* \*